United States Patent [19]
Sokol et al.

[11] 3,831,047
[45] Aug. 20, 1974

[54] CONSTRUCTIONS IN AC GENERATORS

[75] Inventors: Gunter Sokol; Karl Kleebaur, both of Stuttgart, Germany

[73] Assignee: Robert Bosch GmbH, Stuttgart, Germany

[22] Filed: July 1, 1970

[21] Appl. No.: 51,660

[30] Foreign Application Priority Data
Aug. 26, 1969 Germany............................ 1943333

[52] U.S. Cl..................................... 310/68, 310/71
[51] Int. Cl. ............................................ H02k 11/00
[58] Field of Search ....... 310/68, 68 D, 66, 71, 159, 310/171, 168, 43; 339/17 F, 275 B; 264/272

[56] References Cited
UNITED STATES PATENTS
3,093,434  6/1963  Francis .............................. 264/272
3,151,278  9/1964  Elarde................................. 264/272
3,329,840  7/1967  Binder ................................. 310/68
3,362,005  1/1968  Corns.................................. 339/275
3,464,051  8/1969  Webb.............................. 339/275 B
3,538,362  11/1970 Cheetham............................ 310/71
3,539,850  11/1970 Sato..................................... 310/71

Primary Examiner—R. J. Skudy
Attorney, Agent, or Firm—Michael S. Striker

[57] ABSTRACT

An electrically insulating board, placed over the terminals of the diodes of the rectifying circuit of the AC generator, has openings therein that register with these terminals. Bus bars embedded in the board pass through these openings to connect the diodes together and to the generator windings.

13 Claims, 4 Drawing Figures

INVENTORS:
Günter SOKOL
Karl KLEEBAUR

By *Michael J. Striker* their ATTORNEY

CONSTRUCTIONS IN AC GENERATORS

BACKGROUND OF THE INVENTION

The invention relates to improved constructions in AC generators for internal combustion engines.

In prior-art AC generators for internal combustion engines, a plurality of rectifying diodes are connected to the generator output so that at least two diodes are connected together and also to respective ones of the phase-windings of the generator.

With circuits using components able to dissipate only a very small amount of heat, it is customary today to employ a printed circuit to connect together these components. The printed circuit is relatively easy to manufacture, and mistakes rarely occur when wiring the circuit. In AC generators for internal combustion engines, such as the generators for producing current for the electrical lights of a motor vehicle, the generator output is rectified using several individual diodes. These diodes must be connected together and to the leads of the stator winding. These connections should be easy to make, yet they should have a long life and be proof against constant vibration during operation of the motor vehicle and against corrosive agents such as water, dirt and salt.

Although a number of solutions are known to these problems, they are expensive. Usually, the diodes are fixed to individual components that, in turn, are riveted or screwed to the generator. These individual components are connected together by soldered or welded wires or stamped metal parts.

SUMMARY OF THE INVENTION

An object of the invention is to provide a construction that avoids these disadvantages, and which comprises an inexpensive and simple assembly unit for at least some of the diodes.

The invention essentially comprises a plurality of diode means for rectifying the output of a generator having at least first and second phase-windings, each diode means comprising first and second electrodes, at least two of the diode means being connected together by the first electrodes thereof, the second electrodes thereof being secured to respective ones of the first and second phase-windings so as to be connected with the same, and at least first and second bus bar means fixedly connected to respective ones of the first and second phase-windings and to the corresponding one of the first and second electrodes, whereby the diode means and the bus bar means form an assembly unit.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompnaying drawing.

BRIEF DESCRIPTION OF THE DRAWING

FIG. 2b is a view in section taken along line A—A of FIG. 2a; and

DESCRIPTION OF THE PREFERRED EMBODIMENTS

Figure 1:
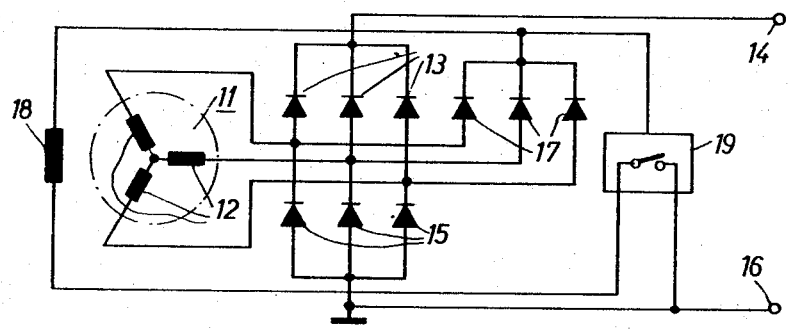
FIG. 1 is a circuit diagram of an AC generator.

With reference to FIG. 1, there are shown the stator 11 with the individual phase-windings 12 of an AC generator. Each of the anodes of the diodes 13 are connected to a different one of the phase-windings 12. The cathode of these diodes 13 are connected together and connected to the positive pole 14 of the AC generator. Similarly, each of the cathodes of the diodes 15 are connected to a different one of the phase-windings 12. The anodes of these diodes 15 are connected together and connected to the negative pole 16 of the generator. The negative pole 16 can be connected to the frame of the vehicle. To each of the phase-windings 12 there is also connected a respective anode of a diode 17. The cathodes of these diodes 17 are connected together and connected to one end of a field winding 18 of the AC generator. The other end of the field winding 18 is connected to a voltage regulator 19. The voltage regulator 19 preferably comprises a semi-conductor switch, which connects the field winding 18 to the negative pole 16 in dependence on the output voltage of the generator. Operating voltage is provided by a line connecting the cathodes of the diodes 17 to the voltage regulator 19.

FIG. 2 shows a heat-dissipating sheet 21 in which the diodes 15 are held, as well as a heat-dissipating sheet 22 in which the diodes 15 are held. The two heat-dissipating sheets 21 and 22 are fixed in any known and suitable manner in the housing of the AC generator. FIG. 2 also shows a plate-like carrier 23, which is made of an electrically insulating material. This carrier incorporates a series of poles 24, 25, 26, 27, and 28. The holes 24 accept the projections 31 and 32 of the respective heat-dissipating sheets 21 and 22. With the aid of these projections 31 and 32, the carrier 23 is held parallel to, and at a definite spacing from, the bottoms of the heat-dissipating sheets 21 and 22. After the projections 31 and 32 of the heat-dissipating sheets 21 and 22 have been guided through the openings 24 of the carrier 23, and the carrier is positioned in place, the projections 31 and 32 are twisted so as to fix the carrier. The carrier openings 25 are so arranged that when the carrier is fixed in place, the anode connections 33 of the diodes 13 automatically project through the openings 25. Similarly, the openings 26 on the carrier 23 are so arranged that the cathode connection 35 of the diodes 15 automatically project through the openings 26.

Figure 2A:
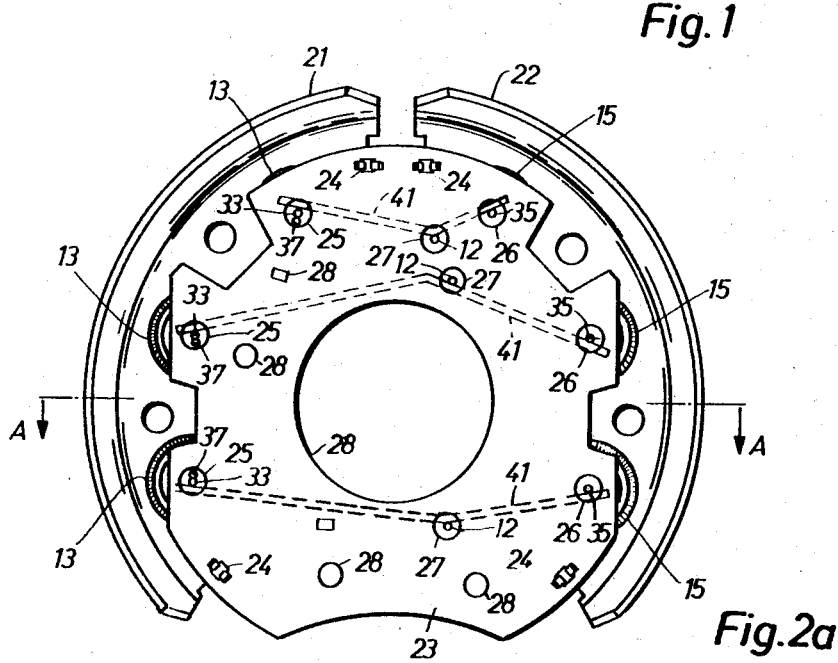
FIG. 2a is a plan view of the arrangement of the invention.
Figure 2B:
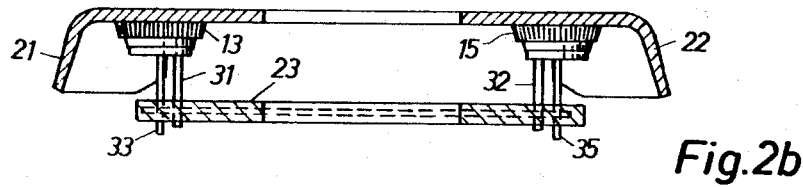

In FIG. 2a, which is a plan view of the rectifier arrangement, there are shown the cathode connection 37 of the diode 17. These cathode connections also project through the openings 25. The didoes 17 are not shown in FIGS. 2a and 2b. The terminals of the phase-windings 12 are led through the openings 27. The openings 28 serve to accept additional components or connecting elements. Bus bars 41 are so embedded in the electrically insulating carrier 23 that the carrier completely surrounds the bus bars. Each of the bus bars 41 leads from one opening 26 through an opening 27 to an opening 25, the bus bar projecting into each of the openings 26, 27 and 25.

Figure 3:
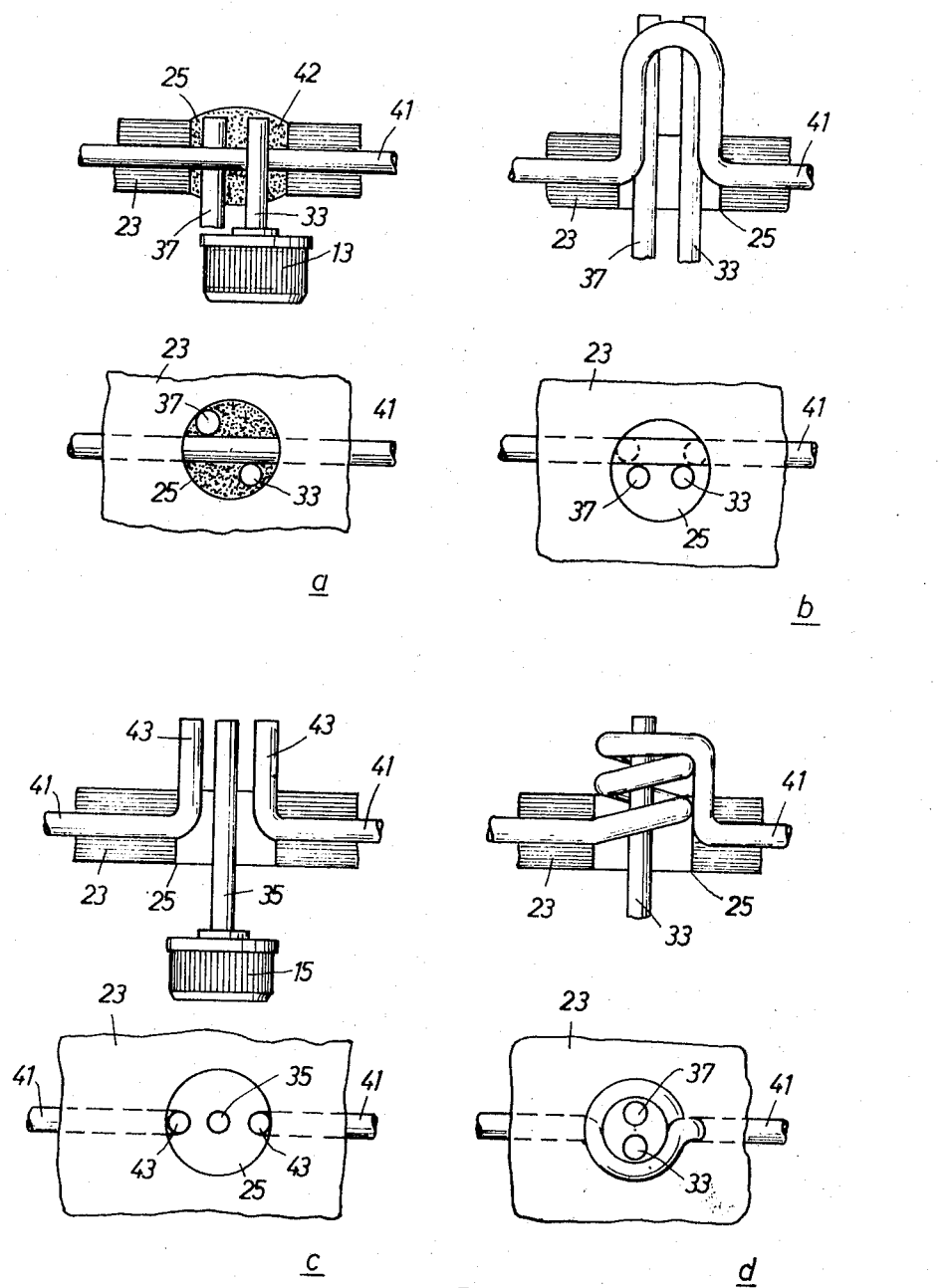
FIGS. 3a, 3a', 3, b, 3b', 3c, 3c', 3d, and 3d' are sectional and plan views of four different embodiments of the bus bars of the invention.

FIG. 3 shows four different embodiments of the shape that a bus bar 41 can take in the neighborhood of an opening 25,26 or 27. In the simplest example, shown in FIG. 3a, the bus bar 41 projects through the opening 25 along a substantially straight diametrical line. The circumference of the opening is made sufficiently large so that there is room on either side of the bus bar 41 and the carrier 23 for introducing the terminal of a component. In the embodiment shown in FIG. 3a there is introduced on the one side the anode connection 33 of a diode 13, and on the other side, the anode connection 37 of a diode 17, not shown. The opening 25 is filled with solder 42 to connect together the bus bar 41, the anode connection 33, and the anode connection 37. In the embodiments shown in FIG. 3b, a length of the bus bar 41 is bent in the immediate neighborhood of the opening 25 so as to form an arch that projects above the surface of the carrier 23. The bus bar 41, moreover, is shifted from the center of the opening 25, so that both connections 33 and 37 are located on the same side of the bus bar. In this embodiment, the connections 33 and 37, on the one hand, and the bus bar 41, on the other, project parallel along an extended path, an arrangement that is particularly advantageous when soldering or welding.

In the embodiment shown in FIG. 3c, the ends 43 of the bus bar 41 in the neighborhood of the opening 25 are so bent that they project out of the opening and above the surface of the carrier 23. The ends 43 are advantageously somewhat flatened by a pressing operation, so that connecting wires, or leads, having a diameter larger than that of the cathode connection 35, can be led through the opening.

In the embodiment shown in FIG. 3d, the bus bar 41 in the neighborhood of the opening 25 has the form of a coil, or helix, an arrangement that is particularly advantageous when the connections 33 and 37 must be soldered to, or wrapped around by, the bus bar 41.

In the embodiment shown in FIG. 3c, the ends 43 of the bus bar 41 are pin-like. In a still further embodiment of the invention, at least part of the bus bar length associated with an opening can be made in the form of a wire. The invention has proven itself to be very reliable in generators for motor vehicles, despite the constant vibration, or the very corrosive atmosphere which is particularly present in winter when salt is strewn on the road surfaces. Moreover, the invention enables the manufacture of reliable circuit plates. The connecting of individual components to the bus bars of the circuit plates is very simply accomplished during manufacture. These connections are firm and reliable.

It will be understood that each of the elements described above, or two or more together, may also find a useful application in other types of constructions differing from the types described above.

While the invention has been illustrated and described as embodied in improved constructions in AC generators, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a polyphase AC generator having at least two phase-windings, in combination, a plurality of diode means for rectifying the generator output, each diode means comprising first and second electrodes, at least two of said diode means being connected together by said first electrodes thereof, and said second electrodes thereof being secured to the respective ones of said windings so a to be connected with the same; a plurality of bus bar means fixedly connected to respective ones of said phase-windings and to the corresponding one of said second electrodes, whereby said diode means and said bus bar means form an assembly unit; electrically insulating carrier means in which said bus bar means are embedded, said carrier means being a plate with openings into which said bus bar means extend, said openings being aligned with at least one electrode of a respective one of said plurality of diode means and the respective electrodes of said phase-windings whereby the corresponding electrode projects into the respective opening and is connected to the corresponding one of said bus bar means; and electrical conductive means in said openings for conductively joining the respective electrodes in said openings.

2. A combination as defined in claim 1, wherein said bus bar means in the immediate neighborhood of the respective circumference of at least some of said openings each comprise at least one length bent to project out of a corresponding opening and above the surface of said carrier means, for connection to the corresponding electrode.

3. A combination as defined in claim 2, wherein said bus bar means length is bent to form an arch that projects above the surface of said carrier means.

4. A combination as defined in claim 2, wherein said bus bar means length at least in part is pinlike.

5. A combination as defined in claim 2, wherein said bus bar means length at least in part comprises a helix that surrounds the corresponding electrode.

6. A combination as defined in claim 2, wherein said carrier means openings are sufficiently large circumferentially so that there is room for at least one electrode of a diode means to be inserted between the sections of the respective bus bar means.

7. A combination as defined in claim 2, wherein said bus bar means length is not centered with respect to the corresponding opening.

8. A combination as defined in claim 2, wherein said bus bar means at least in part is in the form of a wire.

9. A combination as defined in claim 2, wherein said bus bar means length at least in part comprises a flattened cross section.

10. In a polyphase AC generator having at least two phase-windings, in combination, a plurality of diode means for rectifying the generator output, each diode means comprising first and second electrodes, at least two of said diode means being connected together by said first electrodes thereof, and said second electrodes thereof being secured to the respective ones of said windings so as to be connected with the same; electrically insulating carrier means consisting of a plate with openings therein; a plurality of bus bar means fixedly connected to the respective ones of said phase windings and the corresponding one of said second electrodes, said bus bar means being entirely embedded in said plate forming said carrier means and passing through said openings, the portions of said bus bar means passing through said openings forming bent bus bar portions projecting from the respective openings; conductors connected to said first electrodes and projecting into said openings; and electrical conductive means in said openings for conductively joining said conductors connected to said first electrodes to said bent bus bar portions connected to said second electrodes.

11. A combination as defined in claim 10, wherein said projecting bent bus bar portions are curved.

12. A combination as defined in claim 11, wherein said projecting bus bar portions are U-shaped.

13. A combination as defined in claim 11, wherein said projecting bus bar portions are helical.

* * * * *